US011596093B2

United States Patent
Damme et al.

(10) Patent No.: US 11,596,093 B2
(45) Date of Patent: Mar. 7, 2023

(54) METHOD FOR PREDICTIVELY GENERATING DATA FOR CONTROLLING A TRAVEL PATH AND AN OPERATING SEQUENCE FOR AGRICULTURAL VEHICLES AND MACHINES

(71) Applicant: LACOS COMPUTERSERVICE GMBH, Zeulenroda-Triebes (DE)

(72) Inventors: Thomas Damme, Göschitz (DE); Bernd Damme, Langenwolschendorf (DE)

(73) Assignee: LAGOS COMPUTERSERVICE GMBH, Zeulenroda-Triebes (DE)

( * ) Notice: Subject to any disclaimer, the term of this patent is extended or adjusted under 35 U.S.C. 154(b) by 154 days.

(21) Appl. No.: 16/343,525

(22) PCT Filed: Feb. 8, 2017

(86) PCT No.: PCT/EP2017/052715
§ 371 (c)(1),
(2) Date: Apr. 19, 2019

(87) PCT Pub. No.: WO2018/086764
PCT Pub. Date: May 17, 2018

(65) Prior Publication Data
US 2019/0261550 A1     Aug. 29, 2019

(30) Foreign Application Priority Data

Nov. 10, 2016   (DE) .......................... 102016121523.6

(51) Int. Cl.
*A01B 69/04*     (2006.01)
*A01B 79/00*     (2006.01)
(Continued)

(52) U.S. Cl.
CPC ............ *A01B 69/008* (2013.01); *A01B 69/00* (2013.01); *A01B 79/005* (2013.01);
(Continued)

(58) Field of Classification Search
CPC .................................................... A01B 69/008
See application file for complete search history.

(56) References Cited

U.S. PATENT DOCUMENTS

| 6,389,785 B1 | 5/2002 | Diekhans et al. ......... 56/10.2 F |
| 7,593,798 B2 | 9/2009 | Han et al. ....................... 701/50 |

(Continued)

FOREIGN PATENT DOCUMENTS

| DE | 102011107829 A1 | 1/2013 | ............. F03B 11/06 |
| DE | 102012017118 A1 | 5/2014 | ............ B60W 10/22 |

(Continued)

OTHER PUBLICATIONS

Translation document for aplpication AU2016904465, Allen simon, Nov. 2016.*

(Continued)

*Primary Examiner* — Faris S Almatrahi
*Assistant Examiner* — Abdalla A Khaled
(74) *Attorney, Agent, or Firm* — Bodner & O'Rourke, LLP; Gerald T. Bodner; Christian P. Bodner

(57) ABSTRACT

The invention relates to a method for predictively generating data for controlling a drive track and an operating sequence of an agricultural vehicle and of an agricultural machine, the method comprising the steps automatically detecting and storing vehicle and/or machine data through a sensor arrangement that is arranged at individual vehicles or individual machines for generating a vehicle and machine model; collecting and storing data regarding a three dimensional terrain topography and/or data regarding current and/or forecasted terrain properties and/or a weather condi- (Continued)

tion for generating a predictive three dimensional geo referenced terrain model; optimizing imaging of the vehicle and machine model into the three dimensional predictive terrain model and computing drive track control data for defining a drive track and/or machine control data for controlling machine components; putting out and transmitting the drive track control data and/or the machine control data to a control unit of the agricultural vehicle and/or agricultural machine.

11 Claims, 8 Drawing Sheets

(51) Int. Cl.
  *B60W 30/095* (2012.01)
  *B60W 40/076* (2012.01)
  *B60W 50/00* (2006.01)
  *A01B 69/00* (2006.01)

(52) U.S. Cl.
  CPC ...... *B60W 30/0956* (2013.01); *B60W 40/076* (2013.01); *B60W 50/0097* (2013.01)

(56) References Cited

U.S. PATENT DOCUMENTS

| | | | | |
|---|---|---|---|---|
| 2005/0273253 | A1* | 12/2005 | Diekhans | G01C 21/20 701/50 |
| 2006/0212222 | A1* | 9/2006 | Miyoshi | G08G 1/16 701/96 |
| 2008/0082372 | A1* | 4/2008 | Burch | G06Q 40/08 705/4 |
| 2011/0022267 | A1 | 1/2011 | Murphy | 701/38 |
| 2011/0054729 | A1 | 3/2011 | Whitehead et al. | 701/31.4 |
| 2013/0045086 | A1 | 2/2013 | Stummer | |
| 2013/0184944 | A1* | 7/2013 | Missotten | A01D 41/127 701/50 |
| 2015/0024354 | A1* | 1/2015 | Neu | G09B 9/05 434/225 |
| 2017/0245419 | A1* | 8/2017 | Barbosa | A01B 79/005 |
| 2018/0059667 | A1* | 3/2018 | Kuroda | G06F 3/14 |
| 2019/0217864 | A1* | 7/2019 | Kusukame | G01C 21/3691 |
| 2019/0254242 | A1* | 8/2019 | Allen | G06Q 10/06 |
| 2019/0263368 | A1* | 8/2019 | Takahashi | B60W 30/18145 |
| 2019/0278280 | A1* | 9/2019 | Imai | B60K 31/0008 |

FOREIGN PATENT DOCUMENTS

| | | | | |
|---|---|---|---|---|
| EP | 0887660 | A2 | 12/1998 | A01B 69/00 |
| EP | 0970505 | | 7/2003 | H01J 49/02 |
| EP | 1527667 | A1 | 5/2005 | A01B 69/00 |
| EP | 0887660 | | 6/2010 | A01B 69/00 |
| EP | 1527667 | | 4/2013 | A01B 69/00 |
| EP | 2980668 | A1 | 2/2016 | A01B 69/00 |
| WO | WO2012007549 | A1 | 1/2012 | A01B 69/00 |
| WO | WO2016100088 | A1 | 6/2016 | G01C 22/00 |

OTHER PUBLICATIONS

The Notification Concerning Transmittal of International Preliminary Report on Patentability (Chapter I of the Patent Cooperation Treaty), in English, dated May 23, 2019, which was issued by the International Bureau of WIPO in Applicant's corresponding international PCT application having Serial No. PCT/EP2017/052715, filed on Feb. 8, 2017.

The English translation of the International Preliminary Report on Patentability (Chapter I of the Patent Cooperation Treaty), dated May 14, 2019, which was issued by the International Bureau of WIPO in Applicant's corresponding international PCT application having Serial No. PCT/EP2017/052715, filed on Feb. 8, 2017.

The Written Opinion of the International Searching Authority, in English, dated Aug. 23, 2017, which was issued by the International Bureau of WIPO in Applicant's corresponding international PCT application having Serial No. PCT/EP2017/052715, filed on Feb. 8, 2017.

The International Search Report, in English, dated Aug. 23, 2017, which was issued by the International Bureau of WIPO in Applicant's corresponding international PCT application having Serial No. PCT/EP2017/052715, filed on Feb. 8, 2017.

\* cited by examiner

METHOD FOR PREDICTIVELY GENERATING DATA FOR CONTROLLING A TRAVEL PATH AND AN OPERATING SEQUENCE FOR AGRICULTURAL VEHICLES AND MACHINES

The invention relates to a method for predictively generating data for controlling a drive track and an operating sequence for agricultural vehicles and machines according to claim 1.

Devices and methods are known in the art that are configured to provide real time control of agricultural vehicles and agricultural machines. Devices and methods of this type e.g. in the printed documents DE 10 2011 1078 292 A1, EP 0887660 B1, EP 1527667 B1 and EP 0970505 B1.

The recited methods facilitate to travel over a predetermined agricultural surface, e.g. a field in an optimized manner. Thus the drive track is tracked in real time by a navigation system. Additional sensors that are arranged e.g. at the vehicle or in a portion of the agricultural machine that is pulled or otherwise moved by the vehicle record local properties of the drive track, e.g. slopes or so called pitch angles of the vehicle. This prevents that the vehicle tilts at a dangerous angle, that the tools of the agricultural machine dig into the ground or that the processing of the soil, dispensing of seeds, herbicides or fertilizer is done in an unsatisfactory manner due to the orientation of the ground. Thus it becomes possible to counter steer the vehicle when or shortly before a situation occurs that is critical or disadvantageous with respect to ground processing.

The methods and devices that are known in the art are geared towards real time control wherein the real time control does only capture a rather short time window. In agricultural applications however it is not only important to perform the correct control move in a particular situation shortly before or thereafter. A control of this type can always only be used operatively.

It is much more important for a long term processing of a provided agricultural surface to view upcoming developments in advance and to make correct and optimum decisions regarding the use of agricultural vehicles and machines sufficiently far in advance under these boundary conditions that can only be detected to some extent. This applies in particular to situations that have not even occurred yet, but which can already be important when the agricultural vehicle or the agricultural machine has not been used yet.

Real time control only has very limited utility when an agricultural vehicle has gotten stuck in muddy ground because this situation has been unknown in advance or the vehicle has to be directed at short notice over a longer travel distance with increased complexity both should best be avoided in advance.

Thus it is an object of the invention to provide a method that can overcome the recited disadvantages of real time control of agricultural vehicles and machine and that facilitates a future oriented, this means predictive control.

The object is achieved by a method for predictively generating data for controlling a drive track and an operating sequence for agricultural vehicles and machines according to claim 1. The dependent claims relate to useful and/or advantageous embodiments of the method.

The method for predictively generating data for controlling a drive track and an operating sequence of agricultural vehicles and machinery is performed according to the invention according to the following method steps.

Automated detection and storage of vehicle and/or machinery data is performed by a sensor device that is arranged at individual vehicles and/or individual machines for generating a vehicle and machinery model. By the same token collecting and storage of data is performed through a three dimensional surface topography and/or of data through a current and/or predicted terrain consistency and/or weather conditions wherein a predictive three dimensional geo referenced topography model is generated from the data.

In a next step optimizing imaging of the vehicle and machine model is performed onto the 3 dimensional predictive terrain model and drive track control data is computed in order to determine a drive track and/or machine control data for controlling machine components.

Eventually the drive track control data and/or the machine control data is put out to a control unit of the agricultural vehicle and/or the agricultural machine.

Thus, the method according to the invention provides a predictive terrain model. This means that the terrain model does not only represent the current topography but represents the agricultural surfaces that are to be processed in a manner that reflects their forecast future conditions in view of a number of presumptions and prognoses. Thus the terrain model is not only planned as a three dimensional actual condition but also represents an anticipated time based development that is reference to data regarding unavailable agricultural vehicle and machine pool. This means that a current or future machine pool is virtually referenced to an anticipated future terrain condition and planned in an optimizing manner so that the control data can already be generated that is required for a future application of a provided vehicle and machinery pool and so that the control units of the respective vehicles and machines can be provided with the control data in advance.

In one embodiment the data regarding vehicle geometry and regarding the current and/or anticipated operating condition of the agricultural vehicle is continuously captured by an onboard system through telemetry and transmitted to a central data base during automated capturing of the vehicle data.

In one embodiment data regarding a machine geometry and a current and/or anticipated operating condition of agricultural processing components is continuously captured through telemetry during automated capture of the machine data and transmitted to a central data base.

The telemetric capture facilitates a time based capture and tracking of the operating condition of the vehicles of the vehicle pool or the individual agricultural machines of the machine pool thus the telemetric capture is current and also provides conclusions regarding an expected trend in the operating condition within a forecast. Thus an expected future condition of the terrain that is to be processed can be referenced to a future condition of the vehicle and machine pool.

In one embodiment the automatically captured vehicle data and the automatically detected machine data is variably combined when generating the vehicle and machine model wherein the plurality of different vehicle types can be combined with a plurality of different machine types. Thus it is being considered at a level of the virtual models that various actual machine types, e.g. different tractor models can cooperate in different manners with various agricultural machines coupled thereto.

In one embodiment the data regarding the three dimensional terrain topography is collected by processing a volume of geographic data that has been processed in advance. Thus generally available data from existing geo reference and map systems can be used.

In one embodiment of the method data of a plurality of automatic measuring stations that are distributed in the terrain, in particular of measuring stations for soil humidity and/or precipitation is captured while capturing the data regarding the current and/or forecasted soil properties and associated with the amount of geo data.

During an optimized imaging of the vehicle and machine model onto the 3 dimensional terrain model a first optimization algorithm is executed in one embodiment wherein an optimum drive track is computed in view of the current predictable ground properties of the terrain and while avoiding sliding positions, slope positions or tilted positions that are dangerous for the vehicle and machine model, wherein the an optimized operating condition of the agricultural machine that is adapted to the drive track is computed in a second optimization algorithm and the data of the optimum drive track and the data of the optimized operating condition is transferred into the drive track data and the machine control data.

The first and/or the second optimization algorithm can be adaptable and/or influence able in a user specific manner by predetermining adjustable boundary conditions and/or weighting in a user specific manner.

The method can be operable in an offline mode wherein the method steps are performed on an external data processing system, in particular a PC, a tablet computer and/or a cloud computer system that is not connected with the vehicle and/or the agricultural machine.

The method can also be operable in an online mode, wherein the method steps are performed on a control unit that is integrated into the vehicle and/or the agricultural machine, in particular a vehicle computer.

When configuring the method the predictive generation of the data is supplemented by a capture of operative real time data, wherein the operative real time data capture a current actual condition of the vehicle and/or of the agricultural machine and/or of terrain properties. Thus the operative real time data is used to update the predictively determined drive track control data by the control unit of the vehicle and/or the agricultural machine. In this case the predictively generated control data for the vehicles or the machines do not yield a rigid predetermination of a drive track or of diverse operating conditions and procedures, but they can be operatively modified.

The method is subsequently described in more detail with reference to advantageous embodiments. FIGS. 1-9 are used for illustration purposes. Identical reference numerals are used for identical or equivalent components and method steps, wherein:

Figure 1:
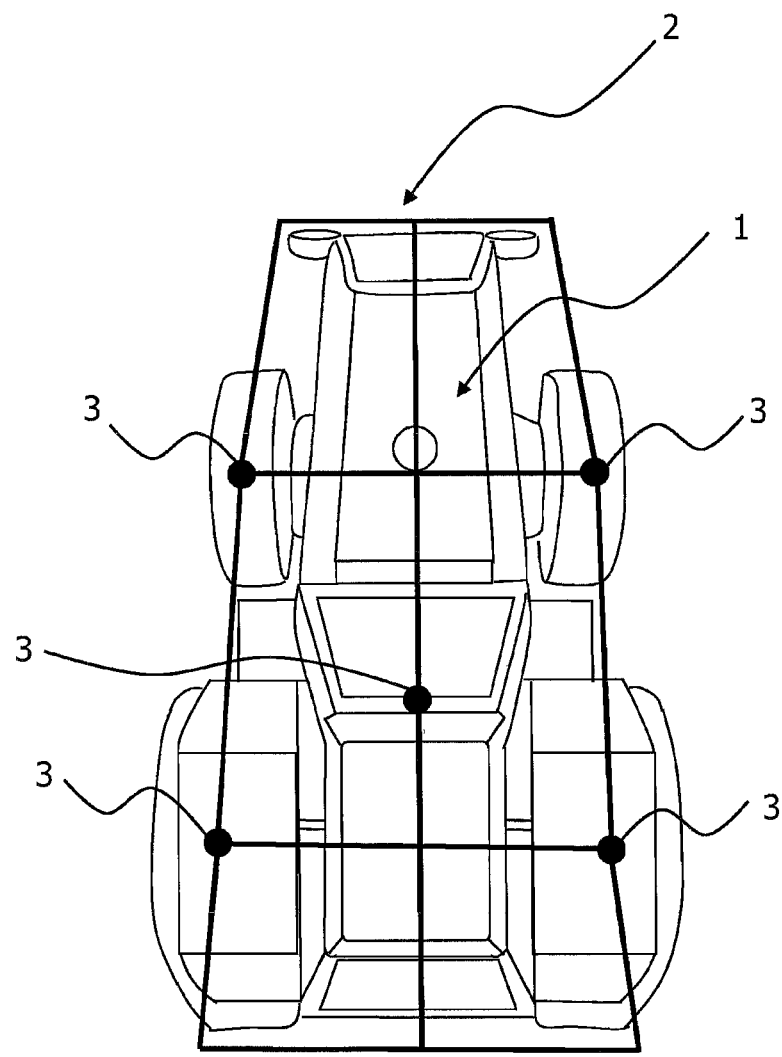
FIG. 1 illustrates an exemplary tractor with a vehicle model derived from the tractor in a top view.

Subsequently using a 3-D terrain model for predictive planning of driving routes of agricultural machines will be described based on embodiments.

The preplanning is performed in a first variant before fielding the vehicles and the preplanning is done by a PC, tablet, a web application or a cloud service in an offline mode. This means that the method steps are preformed on a computer system that is not included in the vehicle or in the agricultural machine but e.g. in an operational center, wherein the obtained results are subsequently transmitted to an onboard system of the individual vehicles and machines.

Alternatively, the preplanning can be performed directly on mobile vehicles computers in an online mode. The offline mode as well as the online mode can be executed with or without using a web or cloud-based data processing and communication. The determined optimized routes can be subsequently transferred to one or plural vehicles as target routes.

The target route however is not predetermined in a rigid manner while driving on the planned route the current conditions are captured by sensors of the vehicle and the situation is checked for possible necessary changes to the route. When necessary, warnings are issued for dangerous situations. Then a new route is computed, or machine functions are initiated in order to react to these changes.

The online mode as well as the offline mode can be used independently from each other when computing the route and when modifying the route while driving. This means in particular the route is computed offline and modified online.

The preplanning that is performed offline as well as online relates to dynamic data of the system including the agricultural vehicle, the agricultural machine and the combination of the agricultural vehicle and the machine. Embodiments dynamic data of this type are vehicle and implement positions, speeds, driving directions, steering data, vehicle and implement data like e.g. adjustable rod linkage angles, dispensing volumes, and anticipated loading volumes of an individual vehicle or of a fleet. This dynamic data is also designated as path or track.

All dynamic system data is thus preplanned in view of the static system data. Static system data is system data that does not change time based, like e.g. predetermined vehicle geometries and load, and the geometric 3-D terrain profile of a parcel to be processed.

The preplanning is intended to facilitate a preview in order to avoid difficult situations. The difficult situations relate in particular to tipping and collision risks with obstacles and other vehicles of a predetermined vehicle fleet and a risk of a collision of the base of outriggers and/or rod linkage with a ground. In order to avoid risks procedures are generated that are geared to drive around uneven ground or terraces, a steering in tight turns and in order to facilitate a drive track that prevents critical situations from occurring in reality.

The preplanning is also intended to provide optimal machine utilization and optimum ground processing of the terrain and processing a plant arrangement, e.g. a harvest. This relates in particular to over dispensing and under dispensing or over dispensing and under dispensing by uneven dispensing at slopes. Furthermore, the preplanning and the planning also relates to computing an optimum track e.g. with the criteria of minimum travel distance, minimum time, minimum cost, minimum consumption while maximizing the utility surface which is processed with these resources and minimizing soil solidification.

It has proven useful to predetermine different optimization stranguries for different areas differently so that avoiding the difficult situations is a predetermined perimeter, thus e.g. in surfaces with critical slope exposure the optimization strategy of shortest travel distance is secondary to an optimization strategy of avoiding tipping risk, whereas the optimization strategy of minimum drive track remains prioritized without restriction in an adjacent terrain area.

This data is used in particular for preplanning the processing (maintained, herbicides and pesticides and fertilization) and harvest of crops on a predetermined terrain.

In a next step a transfer and transmission of the plant optimized routes is performed to agricultural machines. This is performed e.g. by a set of control commands.

The predicative planning that is performed online on the mobile computer of the agricultural machines and vehicles forms a particularly important aspect.

The online preview is performed in view of 3-d terrain profile of a parcel, predetermined vehicle geometries and load, sensors that are arranged on a machine or on the vehicle and a communication channel to other vehicles that maybe provided. Through the communication channel with other vehicles and machines an information exchange is performed between the respective onboard computers regarding the destination track of the vehicles and machines and their sensors. Additionally, the predetermined route can be transmitted through the communication channel which assures overall that a destination tracks of an individual vehicle or of a fleet is maintained overall. The online preplanning is then also used for avoiding collisions between vehicles of the fleet.

This predictive preview can furthermore provide a real-time advance computing of an optimum track for reaching a predetermined optimization criterion. This method is possible when the destination track was not predetermined as being mandatory or when the destination track shall be deviated from or has to be deviated from. Then the predictive advanced computing transitions into operative computing in real time, thus a so called in field navigation. This computing is performed in view of avoiding the difficult situations recited supra and it is based on the current vehicle situation in real terrain under current operating conditions so that self-acting destination acquiring method for autonomous vehicles is implemented.

Also, here an alternate route can be computed in order to prevent for example a tipping or collisions between the vehicles parcel processing strategies can also be planned in advanced wherein the parcel processing strategies are implemented for example by changes of directions of the drive tracks.

The subsequent method that is described based on embodiments is used for computing and using predictively drive tracks in a three-dimensional terrain in order to avoid dangerous situations for agricultural machines. The instant method steps are predicatively configured and based on prediction models for future development. The determined drive tracks are eventually three-dimensional and are 3-D drive tracks as a result.

Computing the drive tracks is performed herein by algorithms for 2-D computing with an additional consideration of elevations from the 3-D terrain model. The derived 3-D drive tracks can be used for several purposes. This relates in particular to a warning against tipping of agricultural machinery at a slope and their display informs of an acoustic warning or an indication on a display.

Based thereon on an alternate route is computed in order prevent the tipping. This is performed by advanced computing of a parcel processing strategy. Changing a direction of drive track is particularly important, an automatic speed reduction through an accordingly generated control command is also possible in order to prevent tipping.

Using the 3-D terrain model for processing, dispensing, and harvesting processes in sloped terrain forms another aspect. This facilitates an anticipatory control of the dispensing volume for fertilizer dispensers and a control of the dispensing angle as a function of the slope. This is performed e.g. by considering that a shorter dispensing width is provided downslope and a wider dispensing width is provided up slope with other operating perimeters unchanged, wherein corresponding control measures are performed in order to maintain a precisely determined operating width.

Additionally, using the 3-D terrain model also avoids erosions caused the field processing in that a corresponding processing strategy is generated in advanced and a path is computed that extends transversal to a predetermined slope.

Accordingly, a predictive control of rod linkages of herbicide sprayers is performed e.g. for preventing a contact of the rod linkage on the ground or on the crop or also a predictive control of the cutting arrangement guidance of combines and shredders so that ground contact can be avoided. Thus, it is also a component of the method to compute an anticipatory mowing strategy which prevents tipping.

Another aspect is anticipatory control of ground processing machines, e.g. plows, tillers, grubbers, mulchers and compensating a downward drift at a slope in order to achieve an optimum processing result.

In combination therewith also computing a 3-D model of a current or anticipated crop can be performed in combination with the 3-D model thus information regarding sun irradiation or other weather impacts in particular in view of so-called weather sides or sun slopes can be considered in prognoses. Thus, a precise surface area of the field is computed in view of the different elevations in the terrain in a 3-D computation instead of merely performing a flat area 2-D computation. Thus, the size of the crop is computed from the size of the field and a height of the crop plants.

Using the 3-D model of crops can also be used for precisely determining a biomass of the crop and for determining logistics of hauling the crop away. This facilitates in particular an anticipatory control of the rod linkage movement of herbicide and pesticide sprayers in order to maintain an optimum distance from the crop.

It is also possible to generate 3-D models of obstacles. Thus, a three-dimensional measurement of obstacles on agricultural surfaces like e.g. utility poles, trees, rows of trees and shrubs, and the obstacles are included into the existing terrain model.

This 3-D model with the integrated obstacles can also be used. To prevent crashes when real terrain is overflown by unmanned small aircraft or drones wherein the crashes are cause by collision with the obstacles and are prevented by advanced computation of the track in view of the 3-D model. This is also used for avoiding collisions of the agricultural machines, in particular of the rod linkages of herbicide and pesticide sprayers with obstacles like e.g. utility poles, rows of trees or shrubs by computing the track in view of the 3-D model.

Different optimization strategies can also be predetermined for specific partial surfaces. In these different optimization strategies, the emphasis can be on considering and avoiding difficult and critical situations so that the optimization criteria of the infield navigation are of secondary importance at least in some points in the terrain model. This relates to the recited tipping of vehicles and agricultural machines, a steering in tight turns, a prevention of a collision with obstacles, determining a good detour around rough terrain or terraces for predetermined vehicle geometries and loads, thus risks areas that need to be avoided with priority. Based on the utilization of these data crops and rows of plants are planned in advanced.

Another option is online preplanning of the track which is preformed on mobile vehicle computers. The mobile vehicle computers are arranged on the respective individual vehicles or in each vehicle of a vehicle fleet and thus facilitates individual preplanning on each vehicle to avoid tipping, collisions with obstacles and fleet vehicles, ground collisions of outriggers or rod linkages or over dispensing/under dispensing or overfertilization/under fertilization by uneven dispensing on slopes. The mobile vehicle computers facilitate computing an optimum track.

Like in the preplanning that performed offline a determination of parcel specific optimization strategies is also possible for the preplanning that is performed online. This is performed in view of providing difficult situations, in particular a tipping, steering in tight turns, avoiding a collision with obstacles, driving around ground discontinuities or terraces for agricultural vehicles and for provided vehicle geometries and loads, wherein a utilization of the data is provided for preplanning of crops or rows of plants.

It is part of the method to automatically and optionally telemetrically read vehicle geometries from the vehicle data of an individual vehicle or from a fleet and utilization of the data for preplanning and warning. Thus, corresponding sensors are arranged at the vehicles and read out can be preformed through the sensors. In combination therewith, a transmission of information can be performed to other machines, in particular within a fleet so that the other machines can also follow the optimized tracks, optionally with a time lag.

It is part of the method to perform condition detection and warning online, e.g. by the mobile vehicle computer and using it to anticipate dangerous situations which are caused by the geometries on the field.

A warning of this type can signal the risk of tipping of an agricultural machine on a slope, e.g. through an acoustic warning and/or an indication on a display in the dashboard in order to indicate the existing danger to the driver. A detour can also be computed in order to prevent the tipping. This can furthermore be performed in combination with precomputing a parcel processing strategy in order to avoid the tipping. Thus, an adjustment of a direction of drive tracks can be performed. This can also be associated with an automatic reduction of the speed.

The 3-D terrain model is furthermore used as a preview element and in order to prepare machine reactions. This is performed in particular in a form of online preplanning on a mobile vehicle computer that is provided as an element. For a predictive preplanning the inertia of the control system of the vehicle and/or of the agricultural machine, this means of the mechanism, the hydraulics and/or pneumatics is also considered. In the context of considering inertia a timely switch of nozzles is performed in a turn, the rod linkage is adjusted when obstacles are visible in a predetermined distance, the nozzles are turned on again coming out of the reversal turn or the dispensing device is adjusted when the geometry changes beyond a predetermined amount. As a measure for the terrain change for example a gradient vector can be computed. The direction of the gradient vector can be assessed with reference to the current or planned driving direction. Does e.g. the driving direction can be changed in a timely manner so that the gradient vector is not cut, but so that the driving is performed parallel to the gradient vector, so that the risk of tipping is minimized by an optimized approach track.

The online warning on the mobile vehicle computer can be configured in particular as a preview which is associated with indications of imminent functions of the machine in order to initiate actions of the vehicle operator in the time available. Thus, it can be signaled for example that a mowing tool has to be lifted from its operating position though the obstacle is still ten meters away, wherein the inertia of the mechanical system of the mowing tool is considered in the computation. When no reaction of the driver occurs in response to the signaling in a particular time period an intermediary forced stop can occur in which the vehicle can only be started again when the mowing tool has been lifted off from the operating position.

Thus, an anticipating control of the dispensing volume of fertilizer dispensers can be performed so that a control of the control angle is performed as a function of the slope so that a shorter dispensing width is set downslope and a wider dispensing width is set up slope with the goal to maintain a precise operating width. Also, this can be signaled to the driver or the adaptation can be performed automatically at the components of the fertilizer dispenser.

An anticipating control of the rod linkage orientation can be performed for herbicide and pesticide sprayers so that a contact of the rod linkage on the ground or on the crop is prevented. In an anticipating control of a cutting arrangement path of combines and shredders the corresponding functional components are adjusted and run, e.g. lifted so that a ground contact is prevented. In combination therewith, an anticipating mowing strategy is computed wherein it is being considered that a tipping of the agricultural machine is prevented in any case.

Subsequently sequences are described in more detail with reference to embodiments and exemplary applications.

FIG. 1. Illustrates an exemplary agricultural vehicle 1 a tractor or a comparable propulsion machine and a vehicle model 2 that is associated with the vehicle. The agricultural vehicle is illustrated herein in an illustration. The vehicle model 2 is a data model of the vehicle that is computed from vehicle data and that includes all important and relevant vehicle parameters in order to be able to image the real vehicle onto a virtual three-dimensional terrain model. The data model of the vehicle as well as the three-dimensional terrain model are not only current but substantially predictive. They do not only reflect a current condition but an extrapolated future condition that is extrapolated over a predeterminable time period. Thus, future situations can be anticipated, and planning can be performed.

In order to generate the vehicle model 2 the relevant vehicle data is determined by a sensor arraignment 3 that is arraigned in the vehicle and is typically made from individual sensors and handed over to a central database. The relevant vehicle data form a vehicle profile which is stored in the database.

The vehicle data that is combined in the vehicle profile includes in this embodiment the wheel spacing between the front wheels of the vehicle, the wheel spacing between the rear wheels of the vehicle, the length of the vehicle wherein in particular possible attachments are considered and detected, the position of the center of gravity of the vehicle, the amount of fuel in the vehicle, the current mileage of the vehicle, maintenance intervals to be obeyed and additional parameters that need to be considered in order to be able to simulate the functionality of the vehicle mode with sufficient precision under particular operating conditions.

Thus, e.g. the wheel spacing, and the achievable steering angles and the vehicle length is required for computing turning radiuses and does for predictive planning of possible drive tracks. The position of the center of gravity of the vehicle is necessary in order to be able to predict possible tilting properties in combination with the vehicle contour. Since the position of the center of gravity is a dynamic variable and a function of loading, fuel loading, and does a function of the time variable mass distribution it is advantageous to state the position of the center of gravity as a function of the recited variables and thus not to predetermine it as a constant. The position of the center of gravity becomes a predictively predetermined variable itself.

The current fuel supply within the vehicle is used e.g. to be able to determine an operating range of the vehicle model in the three-dimensional terrain module in view of up slopes, down slopes, difficult ground conditions or easy ground conditions and similar boundary conditions. The data regarding the current mileage of the vehicle and the maintenance intervals performed for the real vehicle and the repairs consider certain aging events for the vehicle model or facilitate a predictive consideration of a possible operating risk and thus unpredictable occurrences during operations which can also be included into the preplanning of drive tracks and operating tracks. Thus, the vehicle model is configured predictive as a matter of principle and anticipates future operating conditions of the real vehicle.

Figure 2:
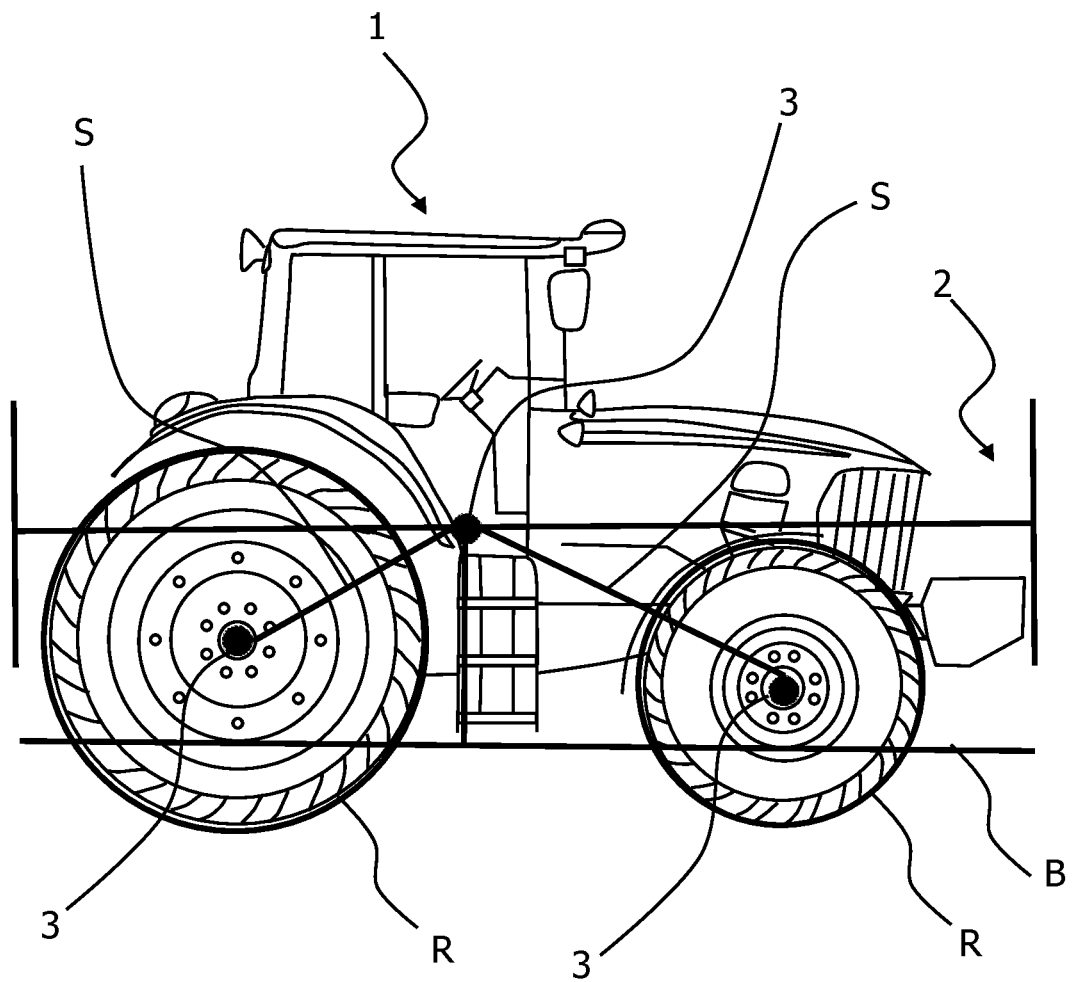
FIG. 2 illustrates the tractor of FIG. 1 in a side view with the vehicle model that is derived from the tractor also in a side view.

Like the real vehicle the vehicle model 2 is configured three dimensional. FIG. 2 illustrates a side view of the vehicle 1 of FIG. 1 in an exemplary matter, thus of the tractor or the propulsion engine and a side view of the vehicle model 2 that is associated with this side view. It is evident that additional parameters of the vehicle have to be considered in the vehicle model, thus in particular the radii R of the vehicle wheels which differ respectively for the front wheels and the rear wheels. Virtual pivot arms S are a well recognizable part of the vehicle model which consider spring suspension travel of front axle and rear axles of the vehicle and a virtual vehicle base B that is used as a reference range of the vehicle model with reference to the base of the virtual three dimensional terrain model and by which a possible ground contact of the vehicle can be defined thus basic dynamic properties of the real vehicle can be modeled in a simple manner.

It is quite clear that the data base does not only include a vehicle model but a plurality of vehicle models of an entire available vehicle fleet wherein a continuous telemetric capture of the current operating condition is performed with respective sensor arraignments for each vehicle type.

Figure 3:
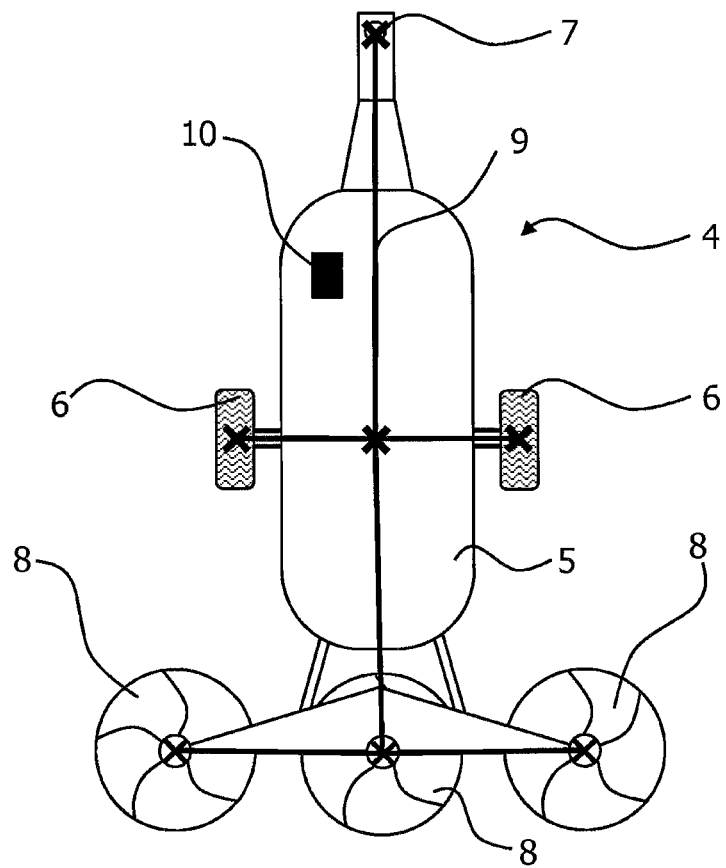
FIG. 3 illustrates an exemplary agricultural machine and a machine model derived from the machine in a top view.

A so-called machine model corresponds to the vehicle model with respect to and agricultural machine fleet and its individual agricultural machines and devices. FIG. 3 illustrates a corresponding embodiment. The figure illustrates a dispensing device 4 for dispensing fertilizer, pesticides or herbicides, as well as dispensable seeds. The trickling device includes a storage container 5, a suspension 6 including two wheels, an outrigger with a trailer coupling of a particular type 7 and as a function component an arraignment of individual distribution devices 8 which are configured in an exemplary manner as rotating plates. Through non-illustrated feed conducts the flowable and dispensable material that is arraigned in the storage container is conducted to the rotating plates. Thus, on the one hand side the feed rate can be regulated by control devices, in particular corresponding control valves and the other hand side the rotating plates can be operated by correspondingly controllable motors with variable speeds. So that a dispensing width of each individual distribution device can be adjusted and adapted.

A machine model 9 is associated with the trickle device. Like the vehicle model 2 the machine model 9 includes data regarding the geometric dimensions of the control device, in particular regarding the distances of the wheels 6 relative to an entire length of the dispensing device from the outrigger with the trailer hitch 7 to the dispensing device 8 and to the geometric dimensions of the distribution device 8 itself, thus in particular to the distance and to the number of the individual rotating plates.

The machine model 9 furthermore includes functional machine and equipment data thus for example a data set with compatibility information can be associated in particular with the real trailer hitch 7 wherein the data set includes information defining a suitability of the dispensing device for particular vehicles and information regarding vehicles that the dispensing device cannot be combined with. A filling level sensor 10 is associated with the storage container 5 wherein a filling level in the storage container is transmitted as contentiously updated information into the machine model of the dispending device. Information regarding distances of the wheels 6 indicate in the machine model which minimum radii can be travelled with the dispensing device, this means which parameters have to be considered in these cases when planning the drive track.

The machine model is also associated with data from which a relationship between positions of the control valves and feed rates of the dispensable and trickle able materials can be derived. An association of this type can be provided as value table or also as predetermined function.

The machine model also includes information e.g. a function or a value table regarding which speed has to be provided at the respective rotating table so that a predetermined dispensing width can be achieved by the dispensing device. From the feed rate of the dispensed material and from the dispensing width an amount of dispensed material per surface unit, this means the dispensing density can be determined theoretically. This means that the machine model is configured according to a predictive statement from which it can be determined in advance how long a supply of dispensable material will last in the storage container when the dispensing device is operated with a particular speed, a particular dispensing width and a particular feed rate. The machine model furthermore includes information which individual rotating disk has to be operated at which speed in order to achieve a predetermined dispensing width and it includes predictively usable information regarding which dispensing density is provided at a predetermined speed of the rotating disk, a predetermined feed rate of the dispensing material and a predetermined driving velocity.

This means that the machine model includes information regarding which operating, and control parameters have to be set in which way in order to operate the trickle device in an optimum manner in few of a particular drive track. It is appreciated that the machine model is configured in a totally different manner with other parameters in other devices for ground processing, e.g. planting machines, plowing arrangements, tillers, mowing machines, shredders, and similar machines, wherein a person skilled in the art will perform corresponding adaptations.

Figure 4:
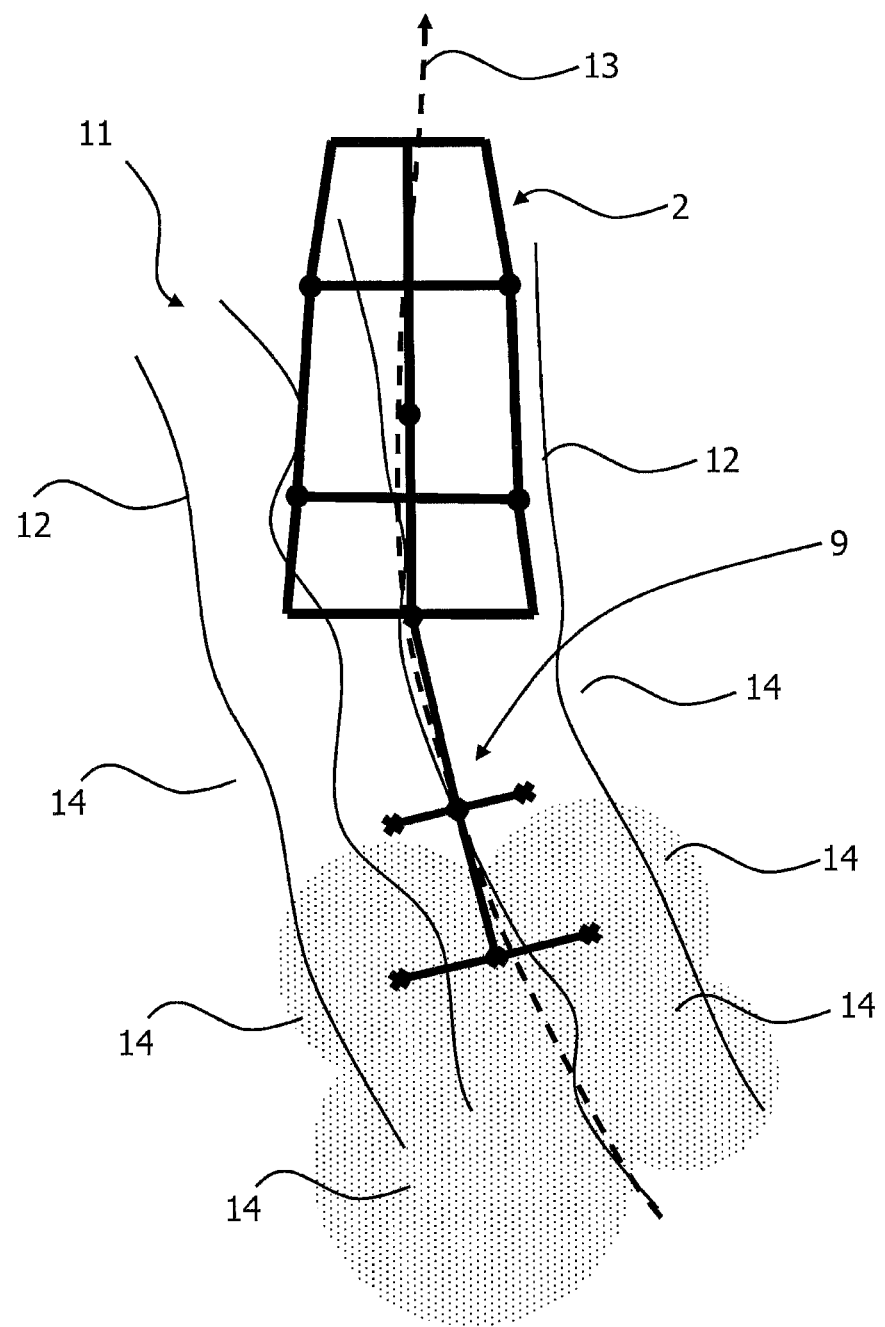
FIG. 4 illustrates the vehicle model of FIG. 1 in combination with the machine model of FIG. 3 in a portion of a 3 dimensional terrain model.

FIG. 4 illustrates imaging the vehicle model 2 and the machine model 9 into a predetermined three-dimensional terrain model 11. The vehicle model 2 and the machine model 9 are thus combined with each other. The dispensing device represented by the machine model 9 is therefore coupled so to speak virtually to the tractor or the propulsion engine, represented by the vehicle model. In a vehicle pool that is represented by plural different vehicle models and machine models, any combinations can be assembled virtually and inserted into the provided three-dimensional terrain model. In this case the movement properties, the terrain capabilities and the movability of the entire interconnection of tractor and dispensing device are represented by the model "vehicle model and machine model".

The three-dimensional terrain model initially provides an image of a geo referenced three-dimensional topography. In addition to surface data which are unambiguously associated with locations in the real terrain, in particular through geographic position information, each location is also associated with elevation information. In this embodiment the elevation data is indicated by a row of elevation lines 12. The main goal of the instant method is determining an optimum drive track that is illustrated as a drive track 13. The drive track is at an optimum in particular when the combined vehicle and machine model 2 and 9 have yielded optimum ground processing in the predictive preview. Thus, it is determined in particular in view of the three-dimensional terrain model which effect ground processing along a presumed drive track would yield approximately.

In the instant case where the machine model 9 represents a control device maintaining a uniform dispensing density over a wide processing strip with maximum width is desirable. In view of the elevation profile and the resulting ground slope it can be computed for a provided set of machine parameters at the machine model 9 which dispensing width with which dispensing density is thus reach for the dispensing material. In the illustrated embodiment this is indicated by dispensing areas 14 which specify up to which portion a predetermined dispensing density can be achieved.

In this case the type of the parameter that has to be optimized is a function of the respectively selected machine model 9. Thus e.g. for the machine model of a plowing device the penetration depth into the ground can be the parameter to be optimized which has to be determined and optimized according to the topography of the three-dimensional terrain model.

Another important aspect when imaging the vehicle and/or machine model onto the three-dimensional terrain model is predictive forecasting of possible causes of accidents, like e.g. the vehicle bottoming out in the terrain or a possible tipping of the vehicle at slopes or when the vehicle is lifted up on one side and a thus possible avoidance of an actual accident in real terrain.

Figure 5:
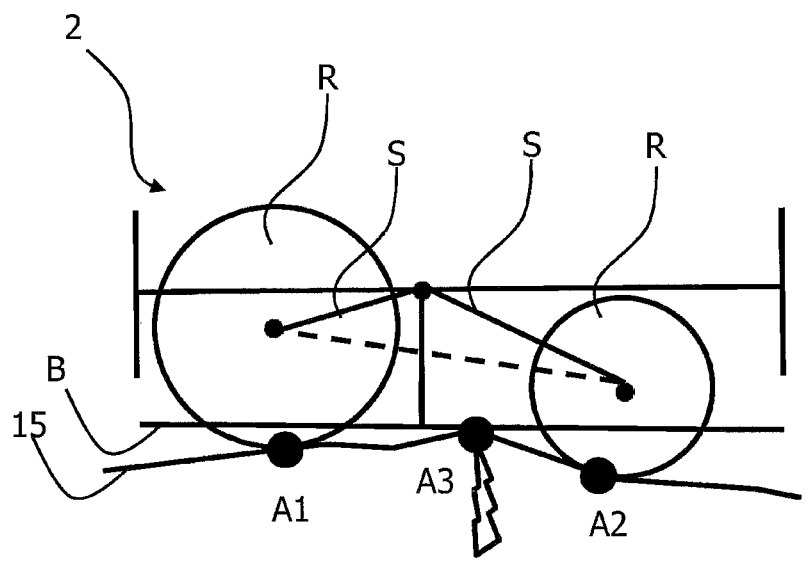
FIG. 5 illustrates the vehicle model of FIG. 2 in a simulated predictive alignment with a portion of the 3 dimensional train model for checking a possible ground contact of the vehicle.

FIG. 5 shows e.g. a predictive determination of a possible bottoming out of a vehicle. In the illustrated embodiment the vehicle model 2 is inserted into a section of the three-dimensional terrain model 11. In the illustrated embodiment the side view of the vehicle model 2 that is shown in FIG. 2 is useful in order to represent the basic method steps for checking for a bottoming out.

The three-dimensional terrain model 11 includes a virtual ground profile 15 that is determined from geo data. In the vehicle model 2 the radii of the vehicle wheels and the pivot arms S that are geometrically determined by the spring travel and the wheel suspensions of the wheels are important e.g. for predictively predetermining a possible bottoming out in the instant embodiment. A virtual vehicle base B defines a mathematical criterion for predicting an actual bottoming out of the vehicle model 2. As evident from the principal view in FIG. 5 the vehicle model 2 is virtually moved over the ground profile 15. Wherein on the one hand side contact points A1 and A2 of the two wheels of the vehicle model are determined on the ground profile and on the other hand side the ground profile is analysis between the contact points A1 and A2. When the ground profile intersects the line of the vehicle base b at least in a third contact point A3 that is arranged between the points A1 and A2 a bottoming out of the vehicle is predictively predetermined. This means that driving through the real terrain with a real vehicle that is represented by the vehicle model shows that the vehicle will most likely bottom out so that the real terrain cannot be travelled by the respective vehicle at this location, at least not in the stated direction but shall be avoided.

The predictive preplanning can develop strategies how a bottoming out can be prevented if the problematic location in the terrain has to be travelled through regardless. It can be proposed for example as an optimization option to increase the tire pressure of the real vehicle slightly in order to raise the vehicle bottom slightly.

Furthermore, an anticipating control of the rod linkage orientation can be performed in order to prevent the rod linkage to bottom out on the base or the crop by lifting the rod linkage. In the same way cutting tools, e.g. in combines, mowers or shredders can be changed in position.

It is also possible to associate attributes with the virtual ground profile of the terrain model wherein the attributes refer to a current or predicted ground properties and take them into consideration. Thus, in particular weather forecasts can be integrated into the terrain model in order to predictively simulate the anticipated ground properties. Thus, for example a deeper sinking of the wheels into anticipated wet or muddy ground can be considered by corresponding movement of the vehicle model, wherein this sinking can also integrate data of the vehicle geometry and operating data like tire width, total mass or contact pressure. Thus, it would be possible as an additional optimization strategy to schedule the driving for a later point in time when the ground is drier again and thus more solid. In this case for example weather dependent drive tracks can be determined and optimized in combination therewith corresponding mission plans can be issued by the system.

Figure 6:
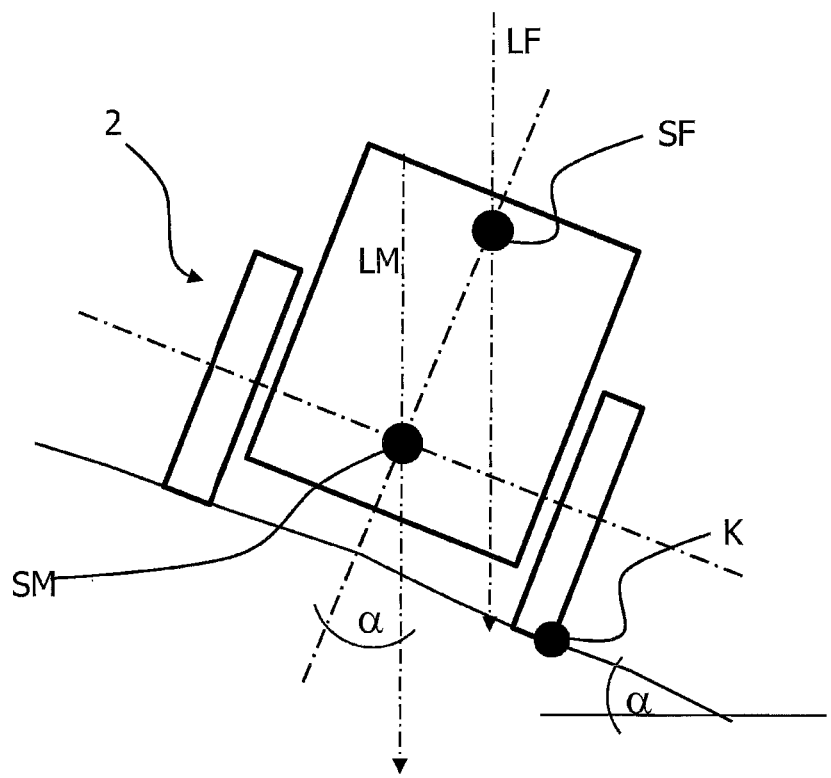
FIG. 6 illustrates a vehicle model in a portion of the 3 dimensional terrain model in a predictive alignment for checking a possible tipping of the vehicle.

FIG. 6 illustrates an embodiment for predictively determining a tipping and/or sliding risk of a vehicle at a slope. In the instant embodiment the vehicle model 2 according to FIGS. 1 and 2 is also used in the instant case the model is schematically illustrated in a view from behind. In order to access a tipping risk the position of the mass center of gravity SM and of the shape center of gravity SF is important. The vehicle model in this case has information regarding the mass distribution in the real vehicle and regarding the vehicle contour so that both centers of gravity can be determined. In order to determine tipping propensity a locale slope, this means a local slope angle $\alpha$ of the three-dimensional terrain model is determined at a location where the vehicle model has been inserted into the terrain model. Then a vertical LM is run through the mass center of gravity of the vehicle model and its path with respect to a tipping point K is determined. A tipping risk is provided when the vertical LM runs on the downslope side of the tipping point K. The tipping risk can be analysis even further in that a position of the vertical with reference to the tipping point is computed more precisely thus various degrees of instability can be defined.

Thus, also other parameters are used for assessment which consider in particular a possible sinking of the down slope wheels of the vehicle model. The sinking depth can also be predictively determined in this case in a value for ground softness is directly determined from possible precipitation volumes and inserted into the computations. When the wheels sink deeper on a downslope this increases the tipping angle α so that the tipping risk increases.

In order to determine a sliding risk, the slope angle α according to the three-dimensional terrain model is used as well. In order to predictively determine the sliding risk a static friction coefficient between the vehicle and the terrain is determined from an existing weather prognosis and a degree of softness and flow of the ground that is associated therewith. Based there on a number of either preplanned or operatively performed adaptations can be performed predictively.

Based thereon a series of preplanned or operatively performed adaptations can be performed predictively as well as for a possible real time influence thus for example an automated speed reduction can be performed in a first step in order to avoid the tipping.

In the same manner also, a corresponding control of the fertilizer dispensing can be performed as a function of the slope thus it is possible in particular to stop dispensing the slope starting with a predetermined slope in order to prevent a washout of the fertilizer.

By the same token a control of the movement of a cutting arrangement of combines and shredders can be performed so that a predictive mowing strategy is computed in addition to avoiding ground contact so that a tipping is prevented.

When several vehicles, this means a fleet is run in combination collisions can be avoided by a control which influences the entire fleet through collective reactions like e.g. mutual braking or adjusting the driving route. The vehicles or agricultural machines thus do not work anymore as individual vehicles but as "social" vehicles.

Last not least the method steps according to FIGS. 5 and 6 facilitate to predictively determine risk situations by driving along the terrain that is represented by the terrain model and selecting corresponding driving routes.

Figure 7:
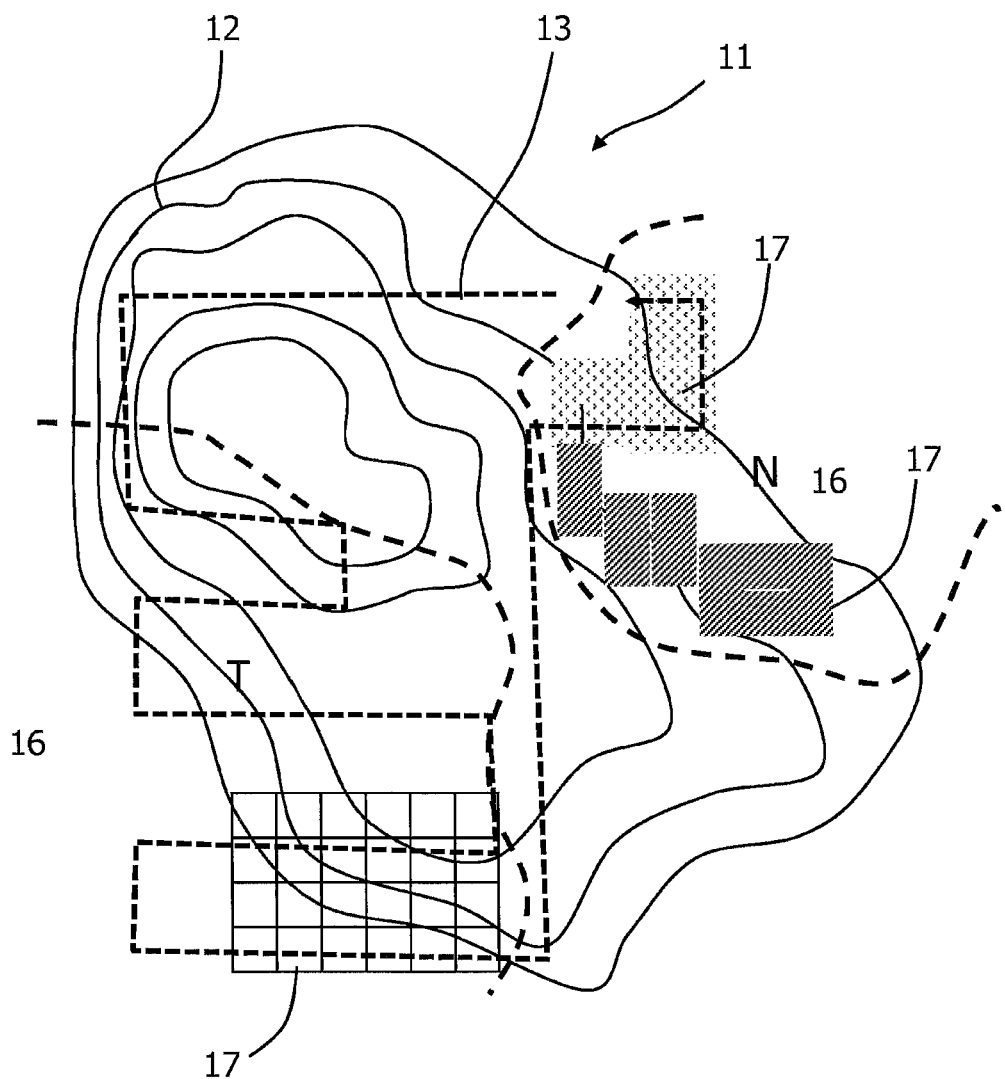
FIG. 7 illustrates an exemplary generation of a predictive drive track in a 3 dimensional terrain model in view of predictively determined ground properties.

FIG. 7 illustrates and exemplary terrain model 11 in a larger overview. As already illustrated supra the terrain model includes elevation information that can be embodied as elevation lines 12.

The terrain model is configured predictive. Thus it models a future condition of a real terrain, wherein future developments and events in the real terrain are extrapolated starting from a current condition in view of particular boundary data and additional information and stored in the terrain model. In the illustrated embodiment the two areas 16 with different ground structures are included in the terrain model. The first area indicates a wet ground area N, the second area marks a dry ground area T. As illustrated supra future conditions in these portions can be derived from weather forecasts.

This terrain model is traveled through virtually by the vehicle and machine model, wherein a starting point and an end point and the surface to be traveled through can be predetermined as start values. Thus a number of criteria can be used in order to predictively determine an optimum drive track which can be traveled in a real terrain in an optimum manner. In order to determine an optimum drive track the amount of optimization criteria can be provided in increments. The 3 dimensional terrain model can include for example partial surfaces 17 that can be provided with a defined drive ability index, this means which cannot be traveled under certain conditions and which can only be traveled from or in particular directions or which can be traveled anytime. These partial surfaces are selected sufficiently small in order to facilitate a sufficient quality location resolution in the terrain model, but also large enough so their total number is limited, and the computation complexity is kept at a reasonable level.

A decision whether a particular partial surface can be traveled in the terrain model, under which boundary conditions this can be performed or whether the field is barred from any driving is e.g. a function of which vehicle model or which machine model is selected. Thus in particular certain fields can be marked as un drive able for certain vehicle models because a bottoming out or a tipping of the vehicle model and/or of the machine model has to be anticipated with certainty. These fields mark in particular sections of the terrain model which are characterized by a large slope, lots of ripples, deep ditches etc.

Other fields of the terrain model are then marked as un drive able. Other fields of the terrain model are then marked as un drive able when the examination yields that the conditions there, e.g. due to precipitation become disadvantageous or dangerous so that a sinking and thus bottoming out the vehicle a sliding or tipping is eminent. Thus also recommended or predetermined entry directions and exit directions can be provided for each individual field.

Thus, the drive track optimization includes computing a drive track which considers on the one hand side the boundary conditions and each individual field of the terrain model and in which on the other hand side a minimum consumption of fuel and operating agents can be achieved with a maximum efficiency of ground processing. Thus the three dimensional terrain model is a predictively adjustable 3 dimensional terrain model with a permitted direction field over which drive track optimizations are performed as a function of particular vehicle or machine models and whose also predictively determined properties are executed.

As a result the drive track 13 is obtained that is stated as a sequence of navigation commands and directional changes so that a number of control commands for an onboard computer can be implemented within the real vehicle and the vehicle fleet.

The control commands are transmitted e.g. directly in an onboard computer of the real vehicle or a control computer of an agricultural machine. The drive track data that relate to the 3 dimensional predictive terrain model now become predetermined navigation data for the real drive track and the real terrain. The navigation data can be used directly for autonomous control of the vehicle like an auto pilot control, wherein the pulled agricultural machine is simultaneously provided with corresponding control commands so that the control of the distribution device is performed at topographically defined terrain points so that a uniform dispensing density is achieved.

Figure 8:
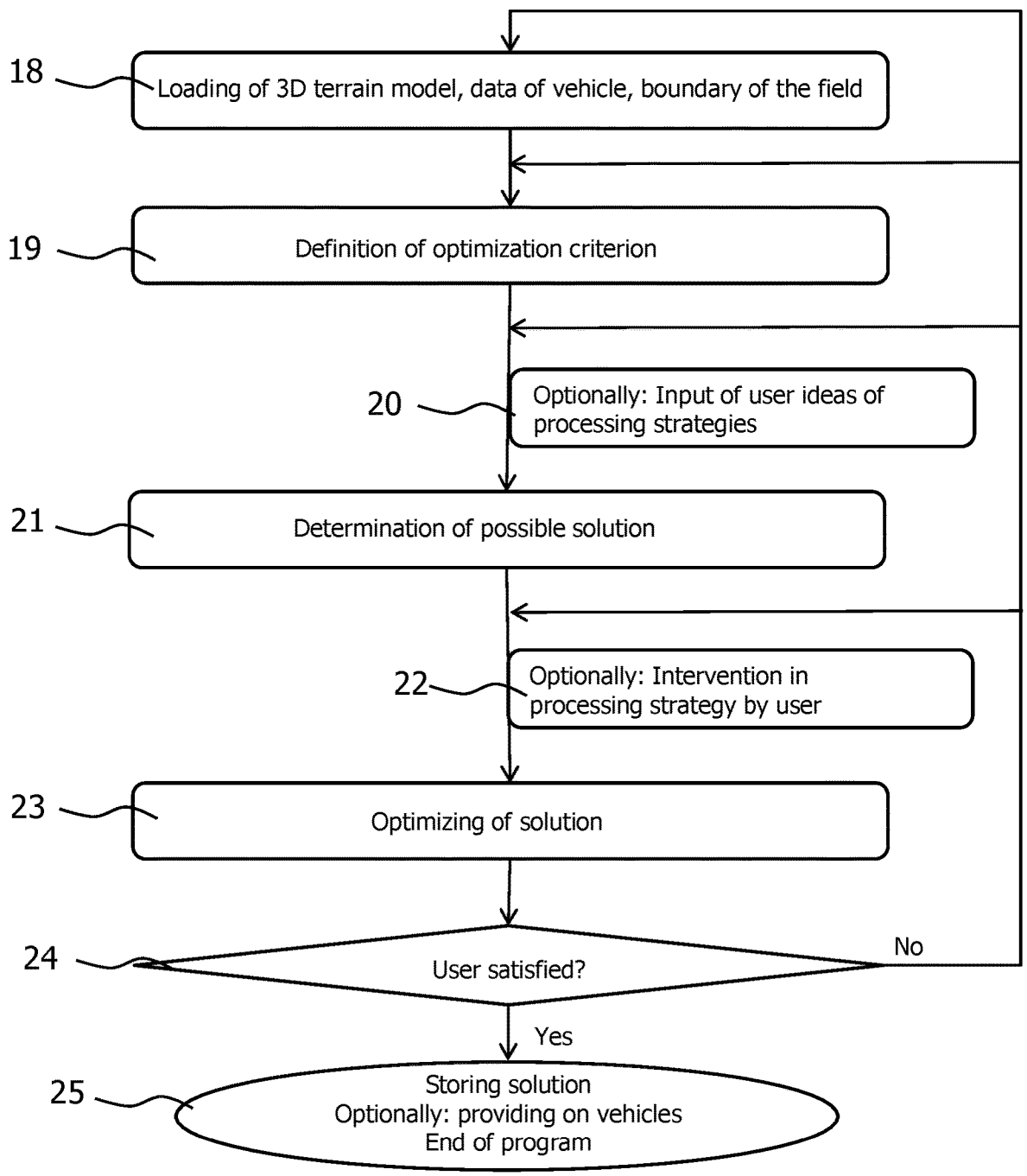
FIG. 8 illustrates an exemplary program routine or interactive advance planning.

FIG. 8 illustrates an exemplary program routine for interactive preplanning. This preplanning is based on a terrain model that is generated in advance and vehicle and machine models and can be executed e.g. as follows:

In the beginning and step 18 a loading of the 3 D terrain model, the data of the vehicle model and or of the machine model is performed into a data processing device, e.g. a stationary computer or a mobile control computer within the vehicle additionally it can be necessary to define a boundary of the field, this means a portion within the terrain model that has to be driven without gaps in between, this means processed.

Based thereon at least one optimization criterion is defined in a step 19, wherein the possible drive track has to be optimized in view of the optimization criterion. This can be e.g. a minimized drive time, a minimized use of operating agents, a maximized processed surface with the means available or similar criteria. Thus the user can predetermine boundary conditions and so called processing strategies in a processing step, this means information regarding which type of optimization criteria shall be fulfilled, thus is can be predetermined e.g. that the drive track has to be minimized but under the limiting condition that steep downward slopes in the terrain model shall be avoided.

In one step 21 a possible solution is determined. This solution forms a starting point for a step 22 in which the user can interfere in the raw draft of the processing strategy and modify the solution. The result comes as an optimized solution 23. This solution can be stored in a step 25 and/or transmitted mobile vehicle control computers. Optionally this solution can be used again as a starting point for a more in depth optimization cycle in a step 24 which can commence at each of the steps 18-22.

Figure 9:
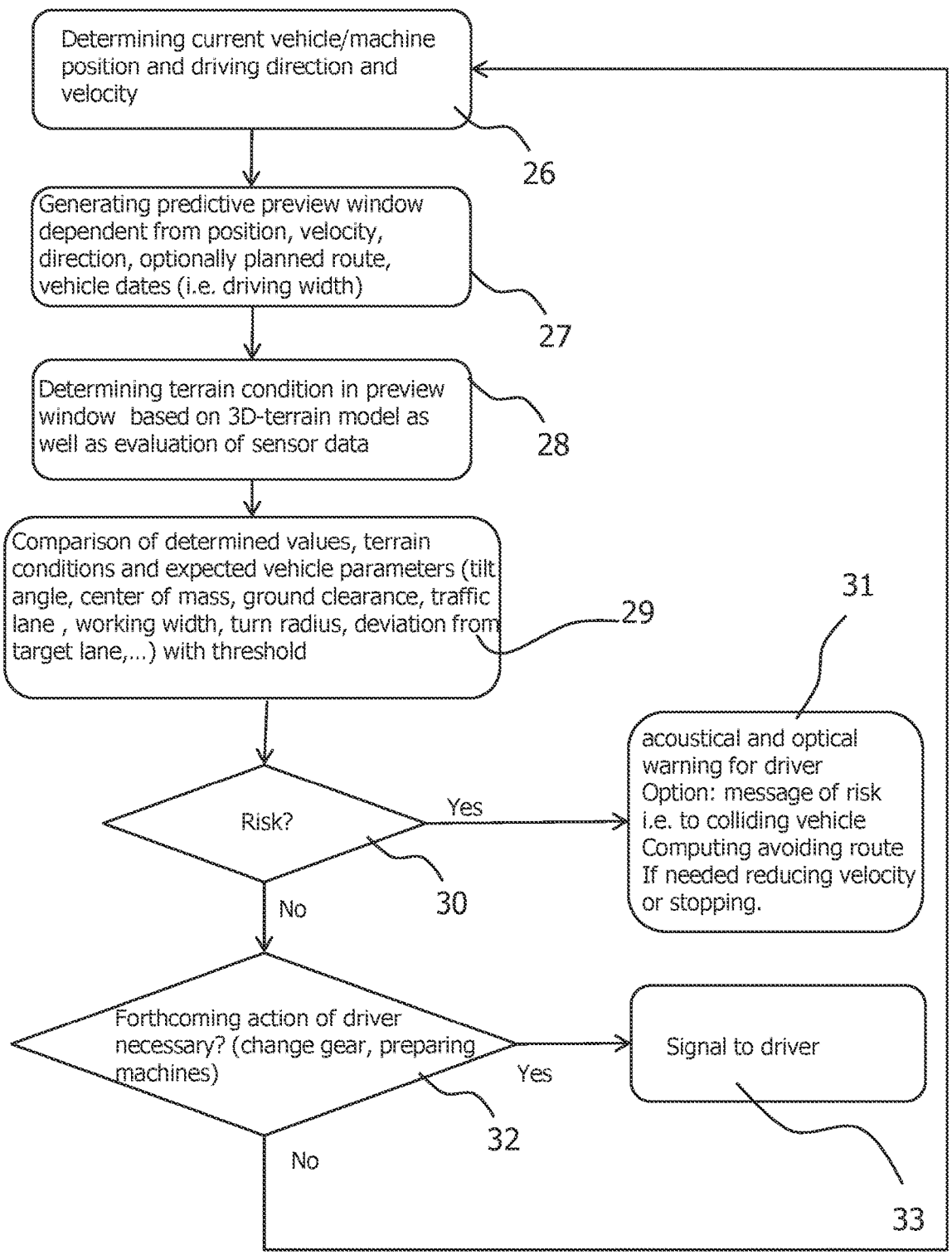
FIG. 9 illustrates an exemplary program routine for a predictive online warning system and a driver assistant.

FIG. 9 illustrates an exemplary program routine for a predictive on line warning system and a drive assistant. This warning system is predictively configured, this means it can determine a dangerous situation already before the terrain is actually driven. However it is also possible to implement real time control when the vehicle actually gets into a dangerous situation.

At the beginning a current position of the vehicle and/or the current driving direction and speed are determined in a step 26. Starting therefrom a predictive preview window is generated in a step 27 wherein the preview window anticipates all anticipate able situations. The preview window is generated as a function of position, speed, driving direction, possibly planned route and vehicle data, e.g. the driving width.

The terrain conditions are determined within the preview window in a step 28. Thus data of the terrain model, sensor data or also anticipated drive track data is being used.

In a step 29 the determined data, terrain conditions and anticipated vehicle parameters e.g. the tipping angle, the center of gravity, the ground clearance the drive track width the operating width, the turn radius, possible deviations from the nominal track are compared with nominal values.

In this comparison step 30, it is decided whether a risk exists when this is the case an acoustic and/or optimum warning for the driver is performed in a step 31, possibly in connection with a communication regarding an existing risk in a form of a voice output. In combination therewith a detour can be computed and/or if necessary the speed can be reduced. The method then reverts to the step 26.

However, also when there is no immediate risk actions by the driver can be necessary. Thus the program can also predictively estimate risk by selecting the preview window large enough. When a potential risk is evident in the preview window it is determined in a step 32 whether an interference might be required or not. If this is the case a signal is put out to the driver and the routine is reset to step 26. When this is not the case the routine is also reset to step 26.

The method was described with reference to advantageous embodiments. Additional embodiments are conceivable by a person skilled in the art and are also specified in the dependent claims.

REFERENCE NUMERALS AND DESIGNATIONS

1 agricultural vehicle
2 vehicle model
3 sensor arrangement
4 dispensing device
5 storage container
6 suspension
7 outrigger with trailer hitch
8 distribution device
9 machine model
10 filling level sensor
11 3 dimensional terrain model
12 elevation line
13 drive track
14 scatter portion
15 ground profile
16 area with different ground structure
17 field with drivability index.
18 loading of 3D terrain model
19 definition of optimization criterion
20 predetermination of boundary conditions and processing strategies
21 solution determination
22 solution determination by user
23 optimized solution
24 in depth optimization cycle
25 storing and optimizing of solution
26 determining current vehicle/machine position
27 generating predictive preview window
28 determining terrain conditions
29 nominal value comparison
30 risk decision
31 output of acoustical/optical warning
32 decision regarding necessary interference
A1 first contact point
A2 second contact point
A3 third contact point
B vehicle base/virtual
K tipping point
LM vertical through center of mass
N wet base portion
R wheel with defined radius
S pivot arm, virtual
SF geometric center of gravity
SM mass center of gravity
T dry ground portion
$\alpha$ local slope angle

The invention claimed is:
1. A method for predictively generating data for controlling a drive track and an operating sequence of an agricultural vehicle (1) and of an agricultural machine (4), the method comprising steps of:
automatically detecting and storing vehicle and machine data through a sensor arrangement (3) that is arranged at individual vehicles or individual machines for generating a vehicle and machine model (2, 9);
collecting and storing data regarding a three-dimensional terrain topography and data regarding current and forecasted terrain properties and a weather condition for generating a predictive three-dimensional geo referenced terrain model (11);
optimizing imaging of the vehicle and machine model (2, 9) onto the predictive three-dimensional geo referenced terrain model (11) and computing drive track control data for defining a drive track and machine control data for controlling machine components;
virtually driving the vehicle and machine model (2, 9) through the predictive three-dimensional geo referenced terrain model (11) before the agricultural vehicle (1) is driven on real terrain;

outputting and transmitting the drive track control data and the machine control data to a control unit of the agricultural vehicle (1) and agricultural machine (4), characterized in that the collecting of data regarding the current and forecasted terrain properties includes capturing data of a plurality of automated measuring stations that are distributed in the real terrain, in particular of measuring stations regarding a ground humidity and an actual amount of precipitation and associating the data with a geographic data set.

2. The method according to claim 1, characterized in that the vehicle data includes vehicle geometry and/or a current or anticipatable operating condition of the agricultural vehicle; and the automated detecting of the vehicle data regarding the vehicle geometry and/or the current or anticipatable operating condition of the agricultural vehicle is telemetrically continuously detected by an onboard system and/or extrapolated and transmitted to a central data base.

3. The method according to claim 1, characterized in that the machine data includes machine geometry and/or a current or anticipatable operating condition of agricultural processing components; and the step of automatically detecting and storing vehicle and machine data includes a step of continuously telemetrically detecting and transmitting data regarding the machine geometry and the current and/or anticipatable operating condition of agricultural processing components and transmitting the data to a central database.

4. The method according to claim 1, characterized in that the step of automatically detecting and storing vehicle and machine data through the sensor arrangement (3) that is arranged at individual vehicles or individual machines for generating the vehicle and machine model (2, 9) includes a step of combining the automatically detected vehicle data and the automatically detected machine data wherein a plurality of different vehicle types can be combined with a plurality of different machine types.

5. The method according to claim 1, characterized in that the collection of data regarding the three-dimensional terrain topography is performed by evaluating a set of geographic data that is generated in advance.

6. The method according to claim 1, characterized in that the step of optimizing imaging of the vehicle and machine model (2, 9) onto the predictive three-dimensional geo referenced terrain model includes a step of performing a first optimization algorithm in which an optimum drive track is computed in view of a current and/or anticipatable ground properties of the terrain and avoiding sliding, slope and/or tipping locations that are dangerous for the vehicle and machine model (2, 9), wherein an optimized operating condition of the agricultural machine is computed by a second optimization algorithm, wherein the optimized operating condition is adapted to the drive track, and the data of the optimum drive track and the data of the optimized operating condition is transferred into the drive track and machine control data.

7. The method according to claim 6, characterized in that the first and/or the second optimization algorithm are adaptable and influenceable in a user specific manner by predetermining adjustable boundary conditions and/or weightings.

8. The method according to claim 1, characterized in that the method is operable in an offline mode, wherein the method steps are executed on an external data processing system that is not connected with the vehicle and/or the agricultural machine, in particular a PC, a tablet computer and/or a cloud system.

9. The method according to claim 1, characterized in that the method is operable in an online mode, wherein the method steps are performed on a control unit that is integrated into a vehicle and/or the agricultural machine, in particular a vehicle computer.

10. The method according to claim 1, which further comprises:

capturing operative real time data, wherein the operative real time data capture a current actual condition of the vehicle and/or of the agricultural machine and/or of current and forecasted terrain properties, wherein the operative real time data is added by the control unit of the vehicle and/or of the agricultural machine so that the computed drive track control data is updated.

11. The method according to claim 1, characterized in that the drive track control data and/or the machine control data is transmitted to a control unit for an autonomous agricultural vehicle without driver or a vehicle fleet and/or a control unit for an autonomous agricultural machine without driver or a machine fleet.

* * * * *